US011176502B2

(12) United States Patent
Chougule et al.

(10) Patent No.: US 11,176,502 B2
(45) Date of Patent: Nov. 16, 2021

(54) ANALYTICAL MODEL TRAINING METHOD FOR CUSTOMER EXPERIENCE ESTIMATION

(71) Applicant: Caterpillar Inc., Deerfield, IL (US)

(72) Inventors: Rahul G. Chougule, Bangalore (IN); Abhishek Ramaswamy, Bangalore (IN); Dhakshinamoorthy A. Mani, Chennai (IN); Prithvi Mohan, Bangalore (IN); Andrew G. Jirovec, Oswego, IL (US); Ankurkumar D. Gandhi, Aurora, IL (US); Jeanne T. Prichodko, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 140 days.

(21) Appl. No.: 16/400,899

(22) Filed: May 1, 2019

(65) Prior Publication Data

US 2020/0349495 A1 Nov. 5, 2020

(51) Int. Cl.
*G06Q 10/06* (2012.01)
*G06N 20/00* (2019.01)
*G06Q 50/00* (2012.01)

(52) U.S. Cl.
CPC ..... *G06Q 10/063116* (2013.01); *G06N 20/00* (2019.01); *G06Q 50/01* (2013.01)

(58) Field of Classification Search
CPC ........... G06Q 10/063116; G06Q 50/01; G06Q 30/016; G06Q 10/20; G06N 20/00
See application file for complete search history.

(56) References Cited

U.S. PATENT DOCUMENTS 6,609,051 B2 * 8/2003 Fiechter .............. G06F 11/2263
700/31
7,698,161 B2 4/2010 Keil et al.
(Continued)

FOREIGN PATENT DOCUMENTS

WO 2018005834 1/2018

OTHER PUBLICATIONS

"Deep Learning Sentiment Analysis of Amazon. Com Reviews and Ratings", N Shrestha, F Nasoz—arXiv preprint arXiv: 1904.04096, 2019—arxiv.org (Year: 2019).*
(Continued)

*Primary Examiner* — Jonathan G Sterrett
(74) *Attorney, Agent, or Firm* — Harrity & Harrity LLP

(57) ABSTRACT

An analytical model training method includes generating a modified set of machine repair records by associating a machine with at least one of i) one or more defects associated with the machine, ii) a repair of the one or more defects, and iii) one or more repair characteristics. An analytical model training system generates a training model based from the modified set of repair records and a set of survey records indicative of reported experience values. The system isolates at least one time-based machine operation parameter associated with machine operation from a set of machine operation records. A modified set of machine operation records is generated that includes a plurality of values associated with the at least one time-based machine operation parameter. An analytical model is configured to output an estimate of customer experience based at least partly on a second set of machine repair records.

22 Claims, 4 Drawing Sheets

(56) References Cited

U.S. PATENT DOCUMENTS

| | | | |
|---|---|---|---|
| 7,814,029 B1* | 10/2010 | Siegel | G06Q 30/0282 |
| | | | 705/347 |
| 8,204,772 B2 | 6/2012 | Babazadeh et al. | |
| 8,396,741 B2 | 3/2013 | Kannan et al. | |
| 20,160,351 | 2/2016 | Barfield, Jr. et al. | |
| 10,157,347 B1 | 12/2018 | Kasturi et al. | |
| 2004/0111314 A1* | 6/2004 | Cavaretta | G06Q 30/02 |
| | | | 705/7.32 |
| 2005/0091642 A1* | 4/2005 | Miller | G06F 11/3664 |
| | | | 717/124 |
| 2007/0028220 A1* | 2/2007 | Miller | G06K 9/6251 |
| | | | 717/124 |
| 2008/0243912 A1* | 10/2008 | Azvine | G06Q 10/06 |
| 2013/0054306 A1* | 2/2013 | Bhalla | G06Q 30/02 |
| | | | 705/7.31 |
| 2014/0089040 A1 | 3/2014 | Nandan et al. | |
| 2015/0051957 A1 | 2/2015 | Griebeler et al. | |
| 2015/0161573 A1 | 6/2015 | Takayuki et al. | |
| 2015/0262107 A1 | 9/2015 | Singh et al. | |
| 2016/0132814 A1 | 5/2016 | Jamison, III et al. | |
| 2018/0121936 A1* | 5/2018 | Madduri | G06Q 30/0282 |
| 2019/0339688 A1* | 11/2019 | Celia | G05B 19/41865 |
| 2020/0159778 A1* | 5/2020 | Mohanty | G06N 3/049 |

OTHER PUBLICATIONS

"Root cause analysis of product service failure using computer experimentation technique", C Shrouti, P Franciosa, D Ceglarek—Procedia CIRP, 2013—Elsevier (Year: 2013).*

Andreas Kopf: "Lidat—Online Monitoring", The 15th North Sea Offshore Crane & Lifting Conference, Apr. 28, 2010 (Apr. 28, 2010), XP055032568, Retrieved from the Internet: URL: http://www.ktf.no/fileadmin/North_sea_offshore-craneNSOCLC2010/1030Kopf.pdf. [retrieved on Jul. 12, 2017] p. 2-p. 13.

* cited by examiner

ANALYTICAL MODEL TRAINING METHOD FOR CUSTOMER EXPERIENCE ESTIMATION

TECHNICAL FIELD

The present disclosure relates to machine learning-driven analytical model training, and more particularly, to a method for training an analytical model for estimation of customer experience.

BACKGROUND

Customer experience related to product quality, reliability, and product service contributes significantly to customer satisfaction, and ultimately, brand loyalty. Gaining insight into customer experience can assist companies by providing reliable and actionable information for product improvement and customer support. Conventional approaches to quantifying customer experience can include conducting surveys, and processing the survey results to interpret average responses in the survey results. However, a very limited proportion of customers may respond to surveys. For this reason, survey-based business decisions can rely on a small sample of customer response, which may not completely encapsulate the facts, or provide reliable information that is current. Other limitations of conventional methods can include inconsistency of the translation of the survey results, and an inability to incorporate the survey results into a model that can also take into account other modes of customer input. For example, current methods may not obtain customer experience data from qualitative sources (e.g., survey responses, social media posts, etc.) as well as quantitative sources (numeric analysis of repair and warranty information, telematics data, etc.).

An attempt to automatically evaluate customer preference information is described in U.S. Patent Application Publication No. 2016/0132814 ("the '814 publication"). The '814 publication describes a system for evaluating customer experience based on real-time product performance data. More specifically, the '814 publication describes a customer experience metric that is calculated based on attributes such as product benefits and product quality. As explained in the '814 publication, such product benefits may be associated with actual customer experiences with a product as compared to published performance specification, design parameters, or operational documentation. Although the '814 publication describes a system that estimates customer satisfaction using data indicative of product performance, the '814 publication fails to address methods for assessing customer experience with products based on data (e.g., warranty data, quality data, dealer data, telematics data, social media data, etc.) collected from multiple types of customer touchpoints with the product manufacturer. Methods such as those discussed in the '814 publication also do not include optimization tools for automatically selecting model parameters that improve the reliability and accuracy of system.

The example systems and methods disclosed herein may be directed to mitigating or overcoming one or more possible drawbacks set forth above.

SUMMARY OF THE INVENTION

According to one aspect, a computer-implemented method of training an analytical model is described. The method includes obtaining a set of machine repair records from a first database, and generating a modified set of machine repair records by, for each record of the set of machine repair records, associating a particular machine with at least one of i) one or more defects associated with the machine, ii) a repair of the one or more defects, and iii) one or more repair characteristics. The method includes generating a training model based from the modified set of machine repair records and a set of survey records indicative of reported experience values. The method includes obtaining a set of machine operation records from a second database, and identifying at least one time-based machine operation parameter associated with machine operation from the set of machine operation records. The method further includes generating a modified set of machine operation records that having a plurality of values associated with the at least one time-based machine operation parameter, and creating an analytical model based on the training model and the modified set of machine operation records. The analytical model is configured to output an estimate of customer experience based at least partly on a second set of machine repair records.

According to another aspect, a system includes a processor configured for obtaining a set of machine repair records from a first database, and generating a modified set of machine repair records by, for each record of the set of machine repair records, associating a particular machine with at least one of i) one or more defects associated with the machine, ii) a repair of the one or more defects, and iii) one or more repair characteristics. The system generates a training model based from the modified set of machine repair records and a set of survey records indicative of reported experience values. The system can obtain a set of machine operation records from a second database, and identify at least one time-based machine operation parameter associated with machine operation from the set of machine operation records. The system generates a modified set of machine operation records that includes a plurality of values associated with the at least one time-based machine operation parameter, and creates an analytical model based on the training model and the modified set of machine operation records. The analytical model is configured to output an estimate of customer experience based at least partly on a second set of machine repair records.

According to another aspect of the present disclosure, a non-transitory computer-readable medium storing computer-executable instruction is described. The instructions, when executed by a processor, can cause the processor to perform actions that include obtaining a set of machine repair records from a first database, and generating a modified set of machine repair records by, for each record of the set of machine repair records, associating a particular machine with at least one of i) one or more defects associated with the machine, ii) a repair of the one or more defects, and iii) one or more repair characteristics. The processor generates a training model based from the modified set of machine repair records and a set of survey records indicative of reported experience values. The processor may obtain a set of machine operation records from a second database, and identify at least one time-based machine operation parameter associated with machine operation from the set of machine operation records. The processor generates a modified set of machine operation records that includes a plurality of values associated with the at least one time-based machine operation parameter, and creates an analytical model based on the training model and the modified set of machine operation records. The analytical model is configured to output an estimate of customer experience based at least partly on a second set of machine repair records.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
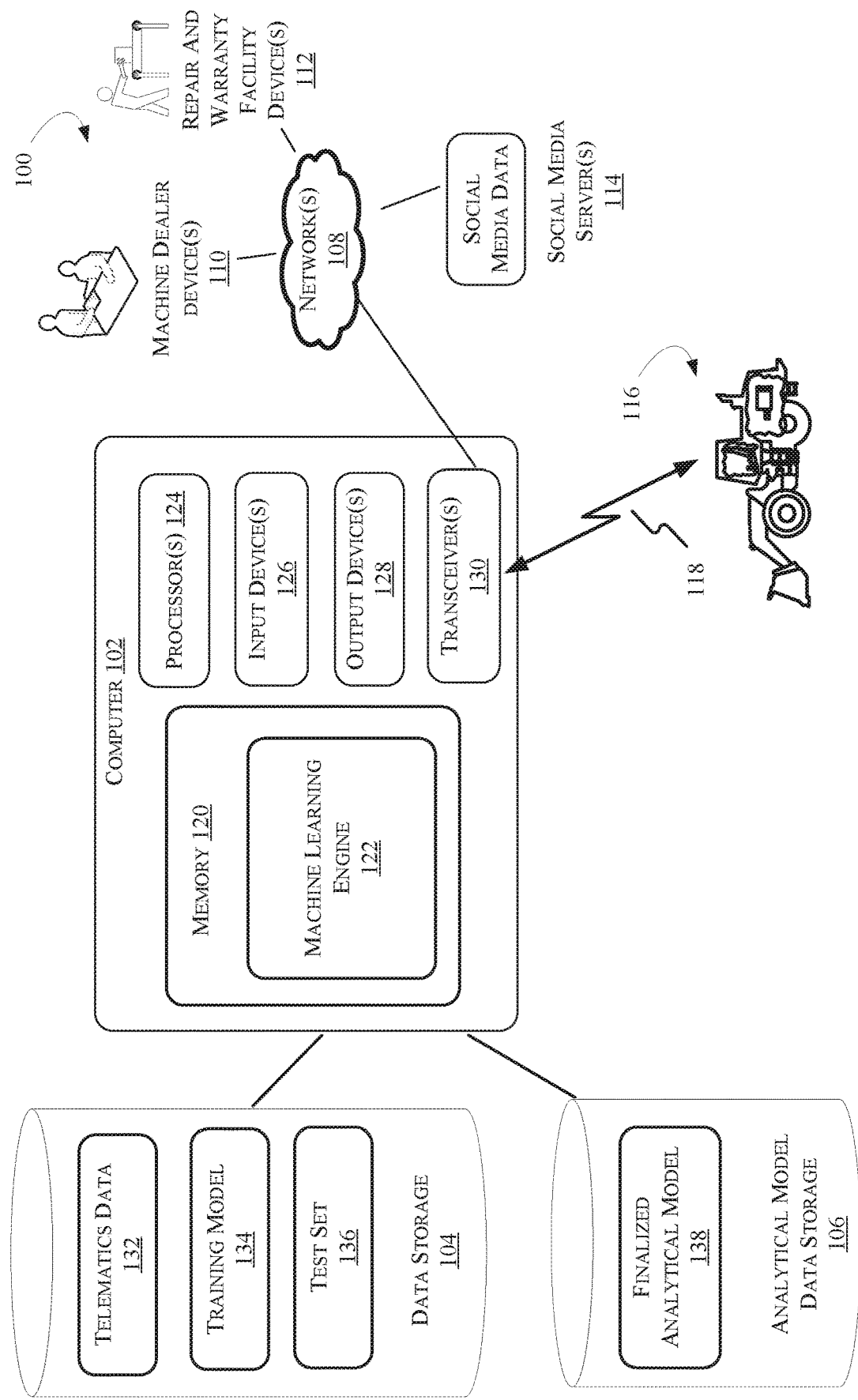
FIG. 1 illustrates a machine learning system for performing an analytical model training process, according to an embodiment.

FIG. 1 depicts a machine learning system 100, according to an embodiment. In one aspect, the machine learning system 100 can include a computer 102 (e.g., one or more servers), that may be operatively connected with one or more machine(s) 116 via a wired or wireless communications channel(s) 118. The computer 102 may be operatively connected to one or more data storage units including, for example, a data storage 104 (that may be configured to store information including telematics data 132, a training model 134, and/or a test set 136), and an analytical model data storage 106 that may be configured to store a finalized analytical model 138. The computer 102 may include, among other things, one or more processor(s) 124, one or more input device(s) 126, one or more output device(s) 128, one or more transceiver(s) 130, and memory 120. As will be described in greater detail below, in example embodiments the machine learning system 100 may be employed to obtain machine repair records from available sources such as repair facilities, machine dealers, and other online sources including, e.g., social media. The machine learning system 100 may generate modified sets of repair records and associating particular machines with one or more machine defects, repair(s) of the machined defects, and/or repair characteristic(s), and identify time-based machine operation parameters from machine operation records associated with the machine defects. In some aspects described in greater detail below, the machine learning system 100 may use the modified set of repair records and the time-based machine operation parameters to create an analytical model that outputs an estimate of customer product experience based on the modified set of repair records and the time-based machine operation parameters. The processor(s) 124 may operate to perform a variety of functions, as set forth herein. For example, the processor(s) 124 may be configured to perform system processing steps using one or more computing engines such as, for example, a machine learning engine 122 depicted in the memory 120. In some examples, the processor(s) 124 may include a central processing unit (CPU), a graphics processing unit (GPU), both CPU and GPU, or other processing units or components.

The input device(s) 126 may include a keypad, a cursor control, a touch-sensitive display, voice input device, etc. The output device(s) 128 may include devices such as displays, speakers, printers, haptic feedback, etc. The transceiver(s) 130 can connect the computer 102 with the machine(s) 116 through one or more network(s) 108. The machine(s) 116 may be configured to provide the telematics data 132 to the computer 102, or another system accessible by the computer 102, and/or through one or more communication channel(s) 118. The transceiver(s) 130 may include wired and/or wireless connections between components included on-board the one or more machine(s) 116, and/or computing devices located off-board the one or more machine(s) 116 such as, for example, the computer 102. The transceiver(s) 130 may connect the computer 102 with a remote server (not shown), machine controller on-board any one or more of the machine(s) 116, and/or a database. The processor(s) 124 may communicate information to the one or more devices via the one or more network(s) 108. The network(s) 108 may include any type of network, such as a public wide-area-network (WAN) (e.g., the Internet), or another wireless network, which may utilize various different technologies including wired and wireless technologies. The processor(s) 124 may further communicate with one or more other devices, such as, for example, the machine dealer device(s) 110, repair and warranty facility device(s) 112, and/or social media server(s) 114. The machine dealer devices(s) 110, and/or the warranty facility device(s) 112 may provide information indicative of machine defects such as the type of defect, parts associated with the defect, machine down time, customer comment regarding machines, etc. Moreover, the social media server(s) 114 may provide social media information having customer comments, opinions, etc., as they may pertain to the machine(s) at issue.

The processor(s) 124 may interact with, or include, computer-readable media, which may include volatile memory (e.g., RAM), non-volatile memory (e.g., ROM, flash memory, a miniature hard drive, a memory card, or the like), or some combination thereof. The computer-readable media may include the memory 120, and can be non-transitory computer-readable media. The computer-readable media may be configured to store computer-executable instructions, which when executed by one or more processor(s), perform the operations described herein.

The computer 102 may employ one or more algorithms, such as a supervised learning algorithm (e.g., an artificial neural network, Bayesian statistics, support vector machines, decision trees, random forest, classifiers, k-nearest neighbor, etc.), unsupervised learning algorithms (e.g., association rule learning, hierarchical clustering, cluster analysis, etc.), semi-supervised learning algorithms, deep learning algorithms, etc. The computer 102 may further include a GRU neural network.

The memory 120 may include the machine learning engine 122 and information associated with building the finalized analytical model 138, such as the training model 134. The memory 120, data storage 104 and analytical model data storage 106 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic tape, magnetic disk storage or other magnetic storage devices, or any other medium which can be used to store the desired information and which can be accessed by the computer 102. Any such tangible computer-readable media, such as the analytical model data storage 106 and the data storage 104 can be part of the computer 102.

Telematics data (e.g., the telematics data 132) can include operational data from one or more machines (e.g., the machine(s) 116) collected through GPS receivers, engine interfaces (e.g., electronic control modules, etc.), on-board SIM cards, accelerometers, sensor data, etc. Telematics data systems collect operational data associated with hardware operation and sensor data associated with the machine(s) 116. Examples of sensor data can include diagnostic information, position information, speed information, operational time information, braking functions signals, driving functions, work tool functions, etc. The telematics data 132 may further include, but are not limited to, geographic information, and/or a specification and health of the corresponding machine, etc. In an example, telematics data 132 may include parameters related to operation of one or more particular machine(s) 116, for example, speed, heading direction, location of the machine, or any other machine sensory information associated with one or more of the machine(s) 116. The telematics data 132 may include positional information indicative of machine movements respect to time, such as, for example, a changing direction or heading of the machine(s) 116 with respect to time, etc. In other aspects, the telematics data 132 may also include a unique identifier (e.g., a license plate number, a machine identification number, a model number, etc.) for the particular machine(s) 116 that have generated the telematics data, date and time information, and/or other information.

The telematics data 132 may also include characteristic data associated with one or more functionalities/characteristics of interest associated with particular machine(s) 116 (and more practically, a plurality of machines). The characteristics of interest may be, for example, fuel consumption or force measurements taken at various locations of the machine(s) 116 such as pressure measurements or other information. As described herein, the telematics data 132 can include data associated with a single characteristic of machine operation (e.g., velocity of the machine with respect to time during a work operation), or it may include data associated with various functions of the machine (e.g., changes in measurements of one or more machine functions with respect to time).

In some examples, the machine learning system 100 may be used to develop one or more analytical models, train one or more such analytical models, and to generate (e.g., based on such training) the finalized analytical model 138. The finalized analytical model 138 can be a mathematical model that may be developed and trained using one or more modeling and optimization techniques. One example of an analytical model is a recurrent neural network (RNN). The finalized analytical model 138 may include one or more algorithms, such as a supervised learning algorithm (e.g., an artificial neural network, Bayesian statistics, support vector machines, decision trees, random forest, classifiers, k-nearest neighbor, etc.), and/or unsupervised learning algorithms (e.g., association rule learning, hierarchical clustering, cluster analysis, etc.), semi-supervised learning algorithms, deep learning algorithms, etc.

Before describing methods of training various analytical models and generating the finalized analytical model 138 using the machine learning system 100, a brief overview of machine learning technology applicable to the present embodiments is provided. Generally, machine learning refers to scientific study of algorithms and statistical models that computer systems use to progressively improve their performance on a specific task. Machine learning algorithms are often built using one or more mathematical models of sample data, referred to herein as training data, to make predictions or decisions without being explicitly programmed to perform the task.

Supervised learning algorithms may include classification algorithms and regression algorithms. Classification algorithms may be used when the outputs are restricted to a limited set of values, and regression algorithms may be optimally used when the outputs may possibly have any numerical value within a range. Accordingly, because there are predictable ranges for the feature data described herein, regression algorithms may be a preferred training method for embodiments described herein.

Machine learning often includes several steps: Data collection and preparation, feature selection, building and training the analytical model, evaluating the trained model, and training the model to optimize outputs (e.g., tuning the model). For at least the first three machine learning operations, it may be preferable to use an artificial neural network as a framework for the predictive analytical model. An artificial neural network, as used herein, may be a computing platform based on a collection of connected units or nodes (sometimes called artificial neurons), which may be loosely model the neurons in a biological brain. Each connection can transmit information from one artificial neuron to another. An artificial neuron that receives a signal can process the signal, and then transmit the signal to additional artificial neurons connected to it. One type of artificial neural network that may be a complementary framework for the finalized analytical model 138 may be a recurrent neural network. For example, a gated recurrent unit (GRU) neural network may be well-suited to generate the finalized analytical model 138, because of its utility in determining optimized weights for various values of input. Other analytical model architectures for sequential prediction may be also used, such as, for example, a temporal convolutional network.

Figure 2:
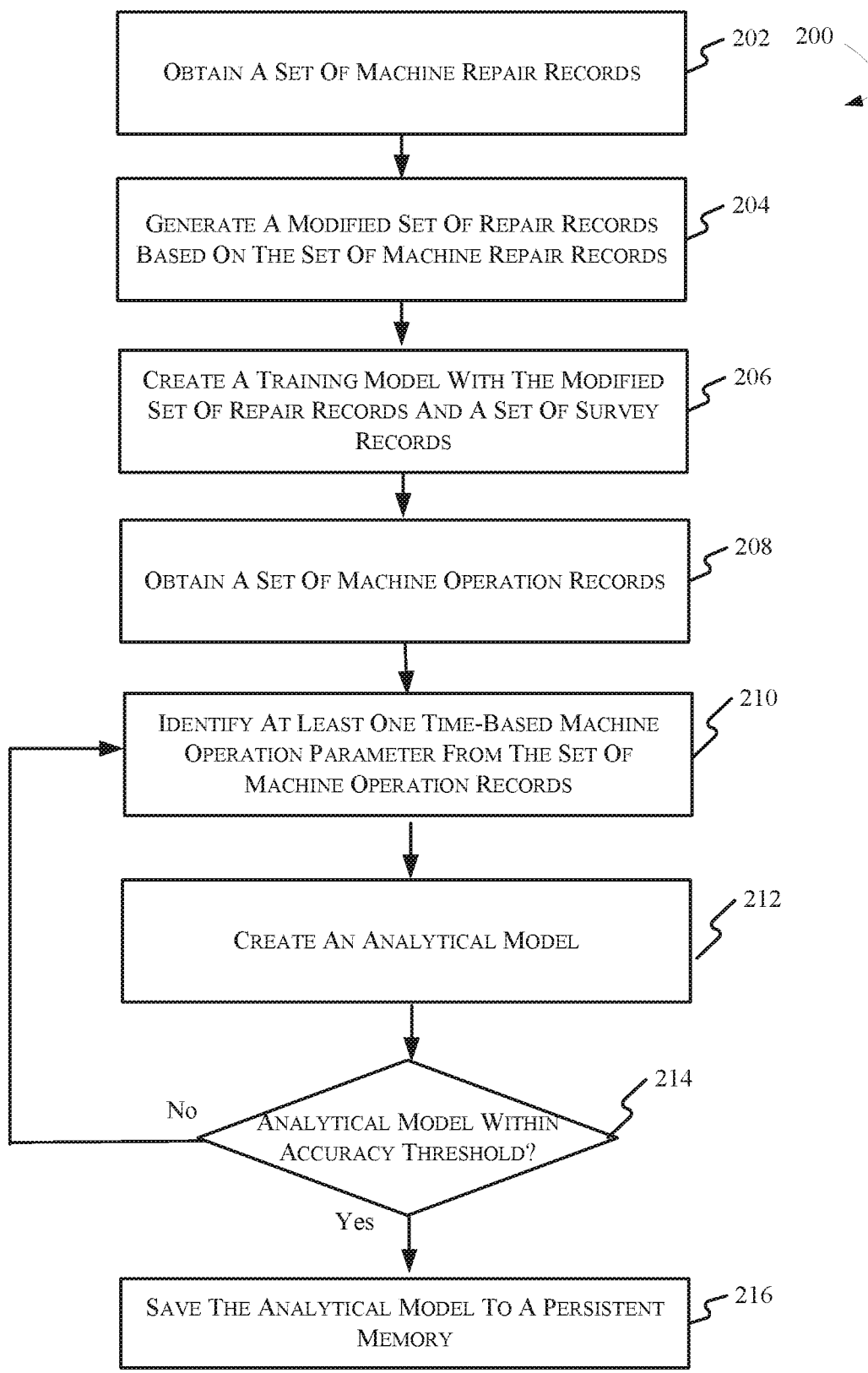
FIG. 2 illustrates a pictorial flow diagram of an example analytical model training process, according to an embodiment.

FIG. 2 depicts a flow diagram of a process 200 for developing and training the analytical model 138, according to an embodiment. Unless otherwise noted, the various steps illustrated in FIG. 2 will be described below with respect to (e.g., as being performed at least partly by) the computer 102 and/or other components of the machine learning system 100 of FIG. 1. Embodiments may be illustrated and described as a logical flow graphs, the operation of which representing a sequence of operations. At least some of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At step 202, the machine learning system 100 may obtain one or more sets of machine repair records from one or more devices including the machine dealer device(s) 110, the repair and warranty facility device(s) 112, and/or the social media server(s) 114, diagnostic information, and/or telematics data.

The machine learning system 100 may obtain, for example, repair and warranty information, machine dealer information, social media information, etc., referred to collectively as "machine repair records." The machine repair records can include information (e.g., features) indicative of a unique machine, a class of machines (e.g., a similar model, a similar manufacturer, etc.), repairs of a machine, machine defects, social media comments regarding machine function, etc. To obtain the machine repair information, in one example embodiment, the computer 102 may connect with the machine dealer device(s) 110 and/or the repair and warranty facility device(s) 112 (FIG. 1) via the networks(s) 108. In another example, the processor(s) 124 may transmit requests to one or more of the machine dealer device(s) 110, the repair and warranty facility device(s) 112, and/or the social media server(s) 114, to obtain specific dataset(s) such as dealer records, customer comment data, sales records of machines sold by the dealership, repair records, etc. The machine learning system 100 may receive responsive communications from the machine dealer device(s) 110, the repair and warranty facility device(s) 112, and/or the social media server(s) 114, having the machine repair records via the network(s) 108. In yet another example, the computer 102 may share a direct connection to a database (not shown) with one of more of the device(s) 110, 112, 114, etc., and may directly retrieve the warranty and repair information from that database. Other methods for obtaining the machine repair records are contemplated.

The set of machine repair records may further include information including, for example, machine parts that were repaired, time information such as date information, time information such as, for example, a time span between repairs, machine down time, etc., service and repair information, machine identification, machine model information, part information, information indicative of a product malfunction, a severity value that indicates severity of a repair, repeat visits given a same customer and/or machine, a model of machine, a class of product, operational information, (e.g., fuel consumption, operating parameters from a machine controller, diagnostic and error information, sensor readings, GPS data, geographic data, etc.), diagnostic information, and/or customer sentiment information (e.g., comments, ratings, etc.).

The machine repair records may also include customer opinions retrieved from social media sources, where the customer opinions indicate information associated with a machine repair, machine operation, reliability, customer satisfaction or dissatisfaction in connection with a machine (e.g., the one or more machine(s) 116), etc. In some aspects, customer expressions of satisfaction, complaint, upset, etc., may be an indication of customer experience if, within a span of time, a machine requires few repairs, few defects, and a relatively long span of time between customer repair visits, a quantified customer experience based on those factors alone may be artificially high when customer sentiment is lower than predicted for other reasons. One example scenario may include a machine or other product that is otherwise reliable and of good quality, but lacking in aesthetic appeal. In another example, perhaps a product infrequently requires warranty repair work (and is therefore reliable and of good quality) yet the machine learning system 100 obtains rating information from online posts that give the machine a low rating, and include key words and phrases such as "loud," "vibration," etc. In one embodiment, a set of social media records may include a plurality of reviews, posts, numeric ratings, star ratings, etc., that may include information that indicates customer experience(s).

Various methods are contemplated that can correlate verbal comments posted on one or more publicly-available and/or privately-available forums (such as the social media server(s) 114 shown in FIG. 1) into numeric representations that correlate to customer experience. For example, the machine learning engine 122 may access a plurality of social media posts via the network(s) 108, and identify one or more posts associated with a machine, where the post(s) include expressions indicative of customer experience. In one example, a customer experience may include a star rating, and a comment associated with the star rating that identifies a particular machine. The machine learning engine 122 may attribute numeric values to online expressions indicative of customer experience such as star ratings (e.g., from 1-5 stars), numeric ratings (e.g., from 1-10), and verbal expressions (e.g., −0.5 for a word or series of words within a group of string data associated with negative experience, +1 for neutral words within a similar group, and +3 for words associated with positive user experience). While specific computational methodology for arriving at a score estimation is not discussed herein, it should be appreciated that obtaining the set of machine repair records at step 202 may include obtaining available records from the social media server(s) 114, or other sources, and assigns numerical values to those records such that the social media information numerically represents feature data in a consistent way, and in a way that attributes weights to feature vectors in a consistent manner.

A feature may be an individual measurable property or characteristic of a phenomenon being observed. Features are often numeric, but structural features such as strings and graphs are used in syntactic pattern recognition, as may be described with respect to feature data obtained from social media posts and the like. The concept of "feature" may also be related to that of explanatory variable used in statistical techniques such as linear regression. A set of numeric features can be described by a feature vector. An example of reaching a classification from a feature vector can include calculating a scalar product between the feature vector and a vector of weights (coefficients), comparing the result with a predetermined threshold, and deciding the class based on the comparison. Examples of these operations are provided in greater detail below.

At step 204, the machine learning system 100 may generate a modified set of repair records by associating a machine (e.g., the one or more machine(s) 116) with one or more other features such as, for example, one or more machine defects, a repair of the one or more defects, and/or one or more repair characteristics, etc., (discussed hereafter in greater detail). In any of the examples described herein, at step 204 the computer 102 and/or other components of the machine learning system 100 may employ one or more techniques for converting data from its first format (e.g., machine telematics data, social media information, repair and warranty information, machine dealer information, etc.) into another format or structure. Modifying the data set may include, for example, isolating data from the telematics data 132, or performing another similar operation. Although a full discussion of various techniques and processes for performing a data modification may be outside the scope of this disclosure, that modification of a data set can include data discovery, data mapping, code generation, code execution, etc. Several non-limiting examples of data modifications are described in the following paragraphs, including a depiction of a modified set of machine repair records described with respect to FIG. 4.

In one embodiment, generating a modified set of repair records can include, for example, segmenting the set of machine repair records into tabulated values associated with one or more of: like machines, like customers, like defects, severity of defects, time span between two consecutive visits by a single customer, a time span associated with repairing a respective defect, a time span associated with machine inoperability due to a repair and/or a defect, and an indication of whether a respective defect rendered a machine inoperable, and/or other machine repair records. The example depicted in FIG. 4 shows one example of segmented (e.g., tabulated) values associated with machine repair records.

In another embodiment, generating a modified set of repair records may further include organizing features into tabulated values indicative of a machine dealer or organization, warranty expiration dates for a respective machine, a value identifying one or more service technicians that have serviced a respective machine, and/or a predicted experience value associated with a respective customer. In some aspects, the tabulated values may be associated with a predicted experience value for a set of customers sharing a like machine model in common, a predicted experience value for a set of customers sharing a like defect in common, a like machine in common, etc. An experience value may be a numeric value between 0 and 1, where 1 is a positive experience, and 0 is a negative experience. In yet another example, the tabulated values may be associated with a predicted experience value based on one or more numeric representations of social media expressions.

Figure 4:
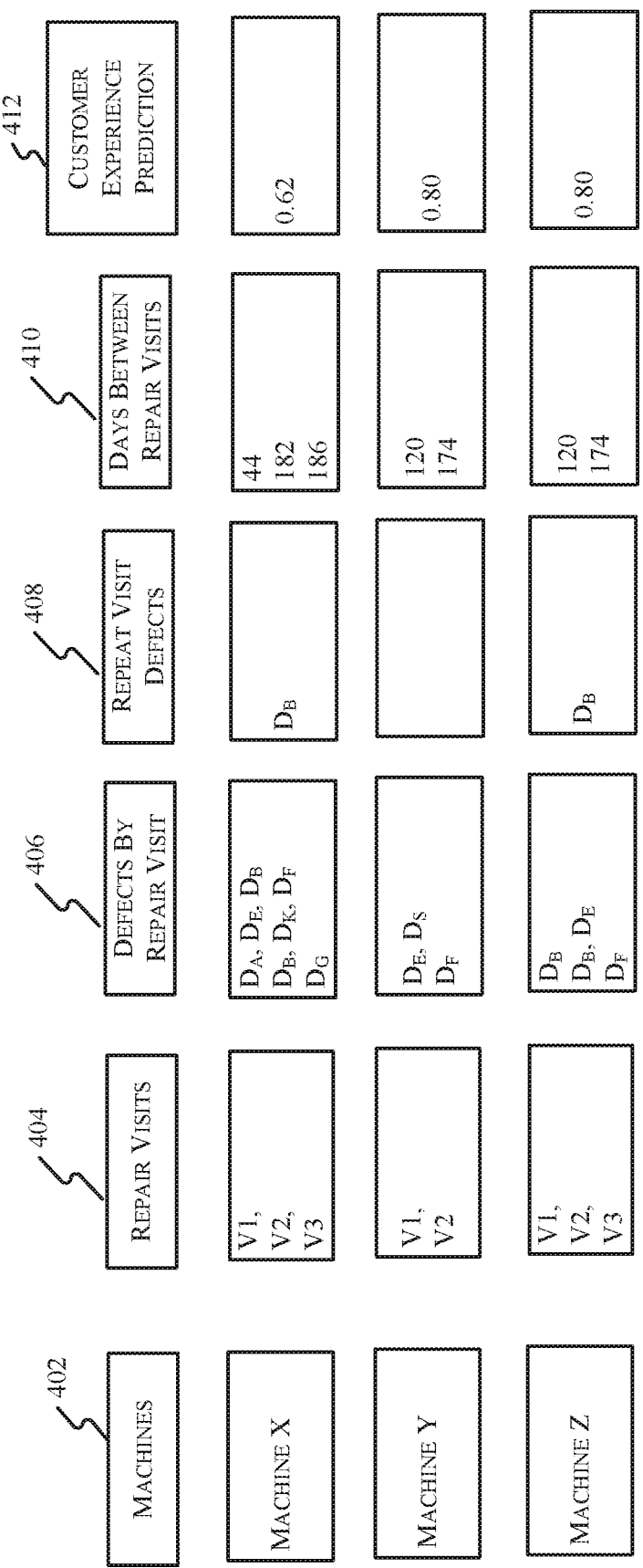
FIG. 4 illustrates a modified set of machine repair records with feature values tabulated.

FIG. 4 illustrates a modified set of machine repair records with tabulated feature values, according to an embodiment. The machine repair records may include any number of and types of feature data that may be associated with respective customer experience prediction(s). For example, a plurality of tabulated values indicating machine identifications 402 are tabulated to correspond with a plurality of values indicating repair visits 404. A plurality of values 406 indicating machine defects identification are depicted. The features shown in FIG. 4 are tabulated by columns of features, and rows of values. A plurality of values 408 indicating repair visits is depicted, a plurality of values 408 indicating repeat visit defects is depicted, and a plurality of values 410 indicating days between respective repair visits is depicted. Although tabulated values 402-410 include five examples of features, it should be appreciated that any number and type of feature data may be included, and may be tabulated in other ways. In one example, the information may be tabulated according to individual customers, repair types, machine down time, etc. When incorporated into a finalized analytical model, a customer experience prediction 412 may be associated with one or more of the tabulated features similar to those shown in FIG. 4

In another embodiment, generating a modified set of repair records can include isolating one or more feature vectors extracted from the set of machine repair records, such as, for example, a number of repairs for a given machine, a time span between the repair visits, and/or a severity estimation of the respective repairs. In some examples, the computer 102 may employ machine learning and/or data processing techniques to isolate a single vector of information from otherwise noisy data. For example, the machine learning system 100 may create a copy of the data in a computer memory, and isolate the characteristic of interest (the feature vector) by deleting all other information from the data set, except the feature information, until the feature vector is isolated. In another example, a data processing algorithm (not shown) may extract the feature vector from a larger body of information by identifying information associated with the characteristic of interest (e.g., the feature), and extracting a copy of only that data as a separate database of values. Other methods are contemplated. The machine learning engine 122 may reshape the isolated data by constructing a computation graph involving a tensor structure, a single matrix, or other similar structure from the isolated data.

With continued reference to FIG. 2, at step 206, the machine learning system 100 may create a training model (e.g., the training model 134 in FIG. 1) based on the modified set of repair records and a set of reported experience values. Creating the training model 134 may include, for example, generating a table having columns of information organized as features (feature vectors), and rows of information organized as instances or observations of respective features. In one aspect, the machine learning system 100 may initialize an unpopulated table having no features and/or observation values. In another embodiment, the training model 134 may include one or more features, feature vectors, and/or observations in an initialization copy, where the initial values may be augmented by adding to, deleting, or otherwise manipulating in the following training steps. In one embodiment, the modified set of repair records may indicate a number of defects associated with a machine, a severity for the defect(s), a time span between repairs, and/or a predicted experience value. The training model 134 may include one or more correlations between at least one feature vector and a predicted customer score associated with that feature vector. The training model 134 may comprise a framework that may be augmented through iterative improvements. Stated in another way, the training set may be, in one aspect, a draft model of the analytical model, where the training set can be tested with test data, and iteratively improved until a desired accuracy is achieved, then finalized into the finalized analytical model 138. An example of iterative improvement is discussed hereafter.

The training model 134 and/or the finalized analytical model 138 may be a data structure storing defect information such as machine identification data, defect identification data, values indicative of a respective severity of a defect, a count of defects associated with a respective machine, a respective warranty repair visit, a count of repair visits, a time duration associated with a respective defect, a time duration associated with a respective a repair of a defect, a cumulative repair time for multiple defect repairs given a single repair visit, a machine operability indication that indicates whether a respective defect repair rendered a respective machine inoperable. Other data may be included. The training model 134 can include the table having columns of information organized as features (feature vectors), and rows of information organized as instances or observations of respective features. For example, the feature vector(s) may include information such as, for example, machine identification, defect severity, total defects, indication of machine inoperability due to the defects, total repair visits, time span between respective visits, and defect repair time(s). The row of information may include numeric values for some or all respective feature vectors.

The training model 134 and the finalized analytical model 138 may be, at their core, a tensor structure. In example embodiments, a tensor structure may be embodied as a data object (or a container) that can house data in N dimensions. The machine learning engine 122 may create the tensor structure by generating a computation graph having linear and non-linear operations of that data. Accordingly, the dimensions of the N dimensions in the tensor structure, as described herein, can include various features channel data extracted from the telematics data 132, and features extracted from the modified set of repair records at step 204. The computation graph can include descriptions of the linear and non-linear modifications between different tensors.

Stated another way, a computation graph can include mathematical operations and non-linear activation functions applied to the sensed metrics and other tensor-structured information. In one example, the computation graph may include a set of values that identify individual customers, and/or respective machines associated with the individual customers. In another embodiment, the computation graph can include repair information as described above, including the many variations of features described above.

At step 208, the machine learning system 100 may obtain a set of machine operation records. The machine learning system 100 may obtain the machine learning records in various ways, including via direct connection with the one or more machine(s) 116, and/or by retrieving the telematics data 132 from the data storage 104. In one example embodiment, the computer 102 may connect with the machine dealer device(s) 110 and/or the repair and warranty facility device(s) 112 (FIG. 1) via the networks(s) 108.

At step 210, the machine learning system 100 may identify at least one time-based machine operation parameter from the set of machine operation records, by selecting a characteristic of interest (or alternatively, receiving an input indicative of a characteristic to identify), and selecting information from the set of machine operation records that corresponds with that characteristic. This step may include applying one or more modifications to create a second set of machine operation records having at least one machine operation parameter with respect to time. In an embodiment, telematics data 132 may include parameters related to operation of a particular machine, for example, speed, heading direction, location of the machine, or any other machine sensory information associated with a machine. The telematics data 132 may also include streaming data collected and transmitted using internet of things (IOT) technology configured to capture and stream diagnostic and error events happening in a machine in real time. For example, with reference to FIG. 1, the machine(s) 116 may stream diagnostic information (for example, one or more error code(s), diagnostic code(s), trouble code(s), etc.), fuel consumption metric(s), battery level and/or energy consumption metrics, any of a multitude of sensor data, etc., to the computer 102 via the transceiver(s) 130, where the IOT data is saved in the data storage 104 as part of the telematics data 132. In other aspects, the IOT data may be streamed directly to the network(s) 108 and saved via cloud storage in an applicable remote storage location (not shown). Accordingly, the machine learning engine 122 may access the telematics data 132 and obtain machine operation records, which may be the telematics data 132, or a portion thereof, and isolate at least one parameter using one or more isolation methods described above with respect to step 206.

Considering one such technique for isolating a time-based machine operation parameter, the machine learning system 100 may apply one or more modifications to each machine operation record of the set of machine operation records, where the output of the operation creates a new set of data that is organized and/or weighted to isolate vector data (characteristics of interest that may affect and/or inform a customer experience based on the characteristic). Another example of a characteristic of interest may include a fuel consumption rate value sampled at predetermined increments of time, and recorded in a persistent computer memory as a set of fuel consumption values. In the instant example, fuel consumption rate values sampled during machine operation may be different than (e.g., greater than or less than) a nominal rate by a predetermined threshold rate, which may indicate a component malfunction in the machine. The machine learning system 100 may associate, using one or more machine learning methods, that the machine operating parameter "fuel consumption" may be correlated with a unique customer, a number of repair visits, a particular repair identified at each visit, and/or other information to identify predetermined probability of a low customer experience due to a high probability of multiple mechanical repairs for a single customer. The machine learning system 100 may identify consumption rate information in the machine operation records, and use the consumption rate as one portion of a modified data set by associating various consumption rates with a unique machine, a class of machines, or a particular customer, etc. For example, in generating the modified data set at step 210, the computer 102 and/or other components of the machine learning system 100 may correlate the fuel consumption rate values in the above example with values for expected customer experience given one or more other.

At step 212, the machine learning system 100 may create an analytical model based at least partly on the training model 134. The analytical model can include the training model 134, and one or more time-based machine operation parameters isolated in step 210, where the parameters correlate to at least one other feature in the computation graph generated at step 206. The machine learning system 100 may create the analytical model using, at least in part, one or more data sequences extracted from the telematics data 132, where the sequences represent values for characteristics of interest over time. The one-dimensional sequences may be, for example, a machine component signal value with respect to time, with signal output samples taken periodically (e.g., 1 second intervals, 5 second intervals, etc.). The extracted features may be selected based on a predetermined list of known correlations, such as for example, number of repair visits and customer experience, fuel consumption data and part failure, part failure and customer experience, etc. In other aspects, the machine learning engine 122 may randomly select one or more features to incorporate in a subsequent version of the analytical model, and identify (or eliminate combinations of inputs) based on the cumulative effect on the model. Various machine learning techniques are suited for discovering and evaluating unknown correlations between feature vectors.

Combinations of features can include, for example, time-sequenced inputs of particular signal values, combined with one or more other inputs. Examples of such inputs can include an overall downtime of a machine, frequency of repair visits, etc. Examples of correlations of inputs may include inputs such as time between repair visits, total defects associated with a particular machine, time span of machine inoperability, defects indicated as high severity defects, etc.

At step 214, the machine learning engine 122 may determine whether the analytical model generates values for customer experience that match observed customer experience values given a same or similar set of input data. A difference between an output of the analytical model and a real-life outcome of observed customer experience (e.g., normalized survey information) may be expressed as a numeric value indicative of a system response error. The system response error may be compared to an acceptable threshold value for error to evaluate whether the analytical model is within a threshold accuracy. As used herein, a survey may include questions directed to consumers that can indicate consumer experience and/or sentiment regarding aspects of the customer's interaction with the product. A single survey may focus on different types of topics such as preferences (e.g., for a particular product, model, configuration, etc.), opinions (e.g., what the individual thinks the product) behavior (e.g., customer behavior with respect to using, not using, or performing some action associated with the product), or factual information (e.g., income, biographical information, product types, etc.), among other types of survey topics. Since survey research may often be based on a sample of the population, the success and accuracy of representation of the research may be associated with the representativeness of the sample with respect to a target population of interest to the researcher. That target population can range from the general population of a geographic area, a group of people within that a geographic area, a membership list of a professional organization, or some other commonality. Answers to questions may have a numeric equivalent referred to herein as a customer experience value, where positive survey answers are attributed varying weights between 0 and 1. Other numerical methodologies are contemplated.

The survey information used as test data may include information indicative of circumstances associated with respective survey results. For example, survey may indicate that a customer experience 0.4 out of 1.0 is an expected (observed) customer experience value when a customer has six visits for machine repair within a three-month span of time, and when two items for repair are repaired on two or more of the six visits. In another normalized survey result, a customer experience of 0.7 (a relatively better experience compared with 0.4) is expected when fuel consumption rate in a machine is 10%-18% over a nominal value, and a single repair visit within a six-month span of time was sufficient to correct the issue. Other countless examples are possible. The machine learning engine 122 may generate an estimated experience value, using the analytical model, with inputs that are similar to the circumstances indicated on the survey data, and compare the estimated results to the test data (the actual experience values in normalized survey information).

According to one embodiment, determining accuracy of the training model 134 may be accomplished using various techniques, including for example, correlation coefficient comparison of various input channel data from the telematics data 132, where the correlation coefficients are compared to reported customer experience(s) given a similar or same set of circumstances leading to one or more repairs. In another aspect, determining the response error may include recursive feature elimination, where the finalized analytical model 138 is built using combinations of the input channels from the training model 134. This process recursively groups input channels into combinations of feature vectors until the combination of feature vectors result in a notable positive impact on system response accuracy (or stated in another way, create a system response having a minimized system response error). Responsive to determining that the analytical model does not function within an accuracy threshold, the machine learning system may identify at least one (new) time based machine operation parameter at step 210. This iteration may remove and or add parameters to affect the overall accuracy of the model.

At step 216, responsive to determining that the second system response error is less than or equal to a threshold value for system response error, the machine learning system 100 may generate the finalized analytical model 138 based on the training model 134, and save the analytical model 138 to a persistent memory, such as the analytical model data storage 106.

Figure 3:
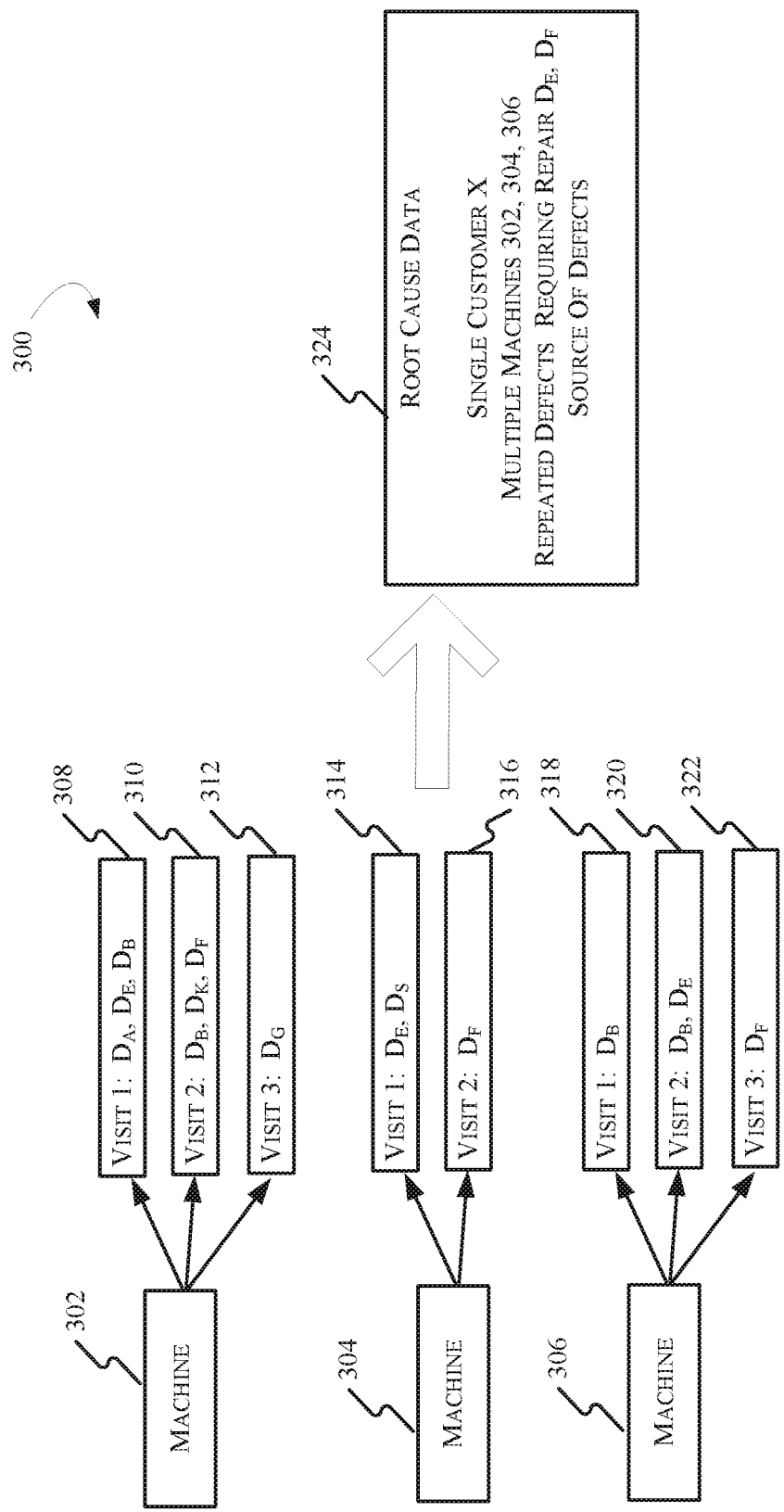
FIG. 3 illustrates a block diagram of a root cause model, according to an embodiment.

FIG. 3 illustrates a block diagram of a root cause model 300, according to an embodiment. In some aspects, it may be beneficial to produce a model for determining one or more root causes of machine malfunction, that can have a direct correlation to a customer experience that is positive or negative when interacting with the machine. In other aspects, the finalized analytical model 138 may include the root cause model 300 (e.g., generated at step 204 and/or step 212 described above with respect to FIG. 2) to provide information that associates a particular machine malfunction with one or more other features such as, for example, machine operation information, diagnostic information, etc. The finalized analytical model 138 may incorporate the root cause model 300 in various ways, to determine circumstances (e.g., feature(s)) that can have a direct correlation to a customer experience that is positive or negative when interacting with the machine.

In particular, FIG. 3 depicts a plurality of machines including a machine 302, a machine 304, and a machine 306. The machines 302-306 may be a single model of machine, owned by various customers, or may be the same or different models of machines, owned by a single customer. In the latter example, a customer may visit a repair facility for machine repair multiple times for one or more machines owned by the customer, including a first visit 308, a second visit 310, and a third visit 312. In the root cause model 300, visits for a respective machine (e.g., the machine 302) are transformed and/or organized into a data structure indicative of defects "Dn" that are repaired at each respective customer visit. For example, at the first visit 308, the machine 302 may have a variety of defects that require repair and/or service, including a defect A (DA), a defect E (DE) and a defect B (DB). It should be appreciated that multiple visits for the same defect may severely diminish customer experience when interacting with a product, and thus, may be a feature sharing a strong correlation with customer experience values. For example, at the second visit 310, the same machine 302 may require service again for defect DB, and additionally, require service for two new defects DK and DF. In one aspect, the root cause data 324 may indicate a correlation between defect DB and customer experience. In other aspects, a root cause for a poor customer experience may be correlated to multiple visits due to the same defect occurring on different machines. For example, the defect E (DE) is repaired in multiple machines, including machine 302, the machine 304, and the machine 306. If the machines are owned by a single customer, multiple visits for repair of the same defect in multiple customer-owned machines may result in a poor customer experience for the owner/customer. In another aspect, if the same defect requires multiple repairs in more than one machine, such is the case in the example of FIG. 3 with respect to defect B (DB), the customer experience may also be predictably poor. As shown in FIG. 3, the third machine 306 requires repair for defect B at a first visit 318, and again at a second visit 320.

The modified set of repair records may include, for example, machine information (e.g., machines 302-306), visit information (e.g., visits 408-322), defect information (e.g., defects DA-Dn), etc. The machine learning system 100 may generate the root cause model 300 indicative of a root cause for two or more of the repairs. In one embodiment, the machine learning engine 122 may create the root cause model 300 by modifying a set of repair records (which may be a plurality of sets such as the repair and warranty information, machine dealer information, etc.), one or more of a machine part, an identification of a service organization associated with the machine, or an identification of a technician associated with the machine, etc. The machine learning engine 122 may create a modified set of repair records that can indicate root cause data 324, which may include aspects such as an identification of a single customer, and identification of multiple machines owned by the single customer X, and repeated defects that required repair multiple times. In other aspects, the root cause data 324 may also include information indicative of a source of the defects such as one or more causes of part failure.

INDUSTRIAL APPLICABILITY

The exemplary systems and methods of the present disclosure may provide holistic tracking of customer experience in real time over the product life cycle of machines of different types. Embodiments described herein may train an analytical model to aggregate quantified customer experience indicators such as product ratings, comments, repair information, defect information, and time factors, and generate an output that predicts a customer experience given various control parameters that may be included in the analytical model. By providing an increased understanding of customer satisfaction that is aggregated across an entire population of product customers, embodiments of the present disclosure can provide analytical models that generate quantitative and actionable information in real-time. The analytical models may provide holistic tracking of user and product experience. While conventional methods may rely on relatively small samples of product customer feedback, the analytical model described herein may evaluate product changes, diagnose product failures and causative factors for repair and service, and discover connections between part-level, system-level, and machine-level functionality issues as they relate to observed customer experience.

Embodiments may be illustrated and described as a logical flow graphs, the operation of which representing a sequence of operations. At least some of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

What is claimed is:

1. A method, comprising:
    obtaining a set of machine repair records from a first database;
    generating a modified set of machine repair records by, for each record of the set of machine repair records, associating a machine with at least one of one or more defects, a repair of the one or more defects, or one or more repair characteristics,
        wherein generating the modified set of machine repair records comprises generating a root cause model indicative of a root cause for two or more repairs, and
        wherein the root cause is associated with one or more of a value identifying a service organization associated with the machine or a value identifying a technician associated with the machine;
    generating a training model, the training model comprising the modified set of machine repair records and a set of survey records indicative of reported experience values;
    obtaining a set of machine operation records from a second database;
    identifying at least one time-based machine operation parameter associated with machine operation from the set of machine operation records;
    generating a modified set of machine operation records, the modified set of machine operation records comprising a plurality of values associated with the at least one time-based machine operation parameter;
    creating an analytical model based on the training model and the modified set of machine operation records;
    receiving, as an output from the analytical model and based at least partly on a second set of machine repair records, an estimate of customer experience;
    determining, based at least in part on a comparison of the estimate of customer experience to a reported customer experience associated with the second set of machine repair records, a first system response error; and
    updating, based at least on the first system response error meeting or exceeding a threshold response error, the analytical model to create an updated analytical model having a second system response error less than the first system response error.

2. The method of claim 1, wherein each record in the modified set of machine repair records is indicative of at least one of a count of the one or more defects, a severity value associated with the one or more defects, a time span between repairs, or a predicted experience value.

3. The method of claim 1, wherein the at least one time-based machine operation parameter comprises time information and at least one of a fuel consumption value, a machine operating parameter, or diagnostic information.

4. The method of claim 1, wherein at least one survey record of the set of survey records is indicative of at least one of a reported experience value, an indication of a surveyed machine, a time factor associated with a utilization of the surveyed machine, or a reported experience value associated with the utilization of the surveyed machine.

5. The method of claim 1, wherein the root cause is further associated with a machine part of the machine.

6. The method of claim 1, further comprising:
    obtaining a set of social media records from a third database;
    associating at least one record of the set of social media records with the modified set of machine repair records to create a set of modified social media records; and
    generating the training model based on the modified set of social media records.

7. The method of claim 1, wherein:
    the analytical model is based at least in part on a first combination of feature vectors associated with the at least one time-based machine operation parameter; and
    the updating the analytical model includes using recursive feature elimination to identify a second combination of feature vectors different from the first combination of feature vectors, the updated analytical model being based at least in part on the second combination of feature vectors.

8. The method of claim 1, wherein the modified set of machine operation records comprises a set of data that is weighted to isolate vector data.

9. The method of claim 1, wherein receiving the estimate of customer experience comprises:
receiving, as the output from the analytical model and based at least partly on the second set of machine repair records, the estimate of customer experience by using the analytical model with one or more inputs that are based on information that indicates a quantity of visits for the reported customer experience associated with the second set of machine repair records.

10. A system comprising:
a processor configured for:
obtaining a set of machine repair records from a first database;
generating a modified set of machine repair records by, for each record of the set of machine repair records, associating a machine with at least one of one or more defects, a repair of the one or more defects, or one or more repair characteristics,
wherein, when generating the modified set of machine repair records, the processor is configured for generating a root cause model indicative of a root cause for two or more repairs, and
wherein the root cause is associated with one or more of a value identifying a service organization associated with the machine or a value identifying a technician associated with the machine;
generating a training model, the training model comprising the modified set of machine repair records and a set of survey records indicative of reported experience values;
obtaining a set of machine operation records from a second database;
identifying at least one time-based machine operation parameter associated with machine operation from the set of machine operation records;
generating a modified set of machine operation records, the modified set of machine operation records comprising a plurality of values associated with the at least one time-based machine operation parameter;
creating an analytical model based on the training model and the modified set of machine operation records;
receiving, as an output from the analytical model and based at least partly on a second set of machine repair records, an estimate of customer experience;
determining, based at least in part on a comparison of the estimate of customer experience to a reported customer experience associated with the second set of machine repair records, a first system response error; and
updating, based at least on the first system response error meeting or exceeding a threshold response error, the analytical model to create an updated analytical model having a second system response error less than the first system response error.

11. The system of claim 10, wherein each record in the modified set of machine repair records is indicative of at least one of a count of the one or more defects, a severity value associated with the one or more defects, a time span between repairs, or a predicted experience value.

12. The system of claim 10, wherein the at least one time-based machine operation parameter comprises time information and at least one of a fuel consumption value, a machine operating parameter, or diagnostic information.

13. The system of claim 10, wherein at least one survey record of the set of survey records is indicative of at least one of a reported experience value, an indication of a surveyed machine, a time factor associated with a utilization of the surveyed machine, or a reported experience value associated with the utilization of the surveyed machine.

14. The system of claim 10, wherein the root cause is further associated with a machine part of the machine.

15. The system of claim 10, wherein the processor is further configured for:
obtaining a set of social media records from a third database;
associating at least one record of the set of social media records with the modified set of machine repair records to create a set of modified social media records; and
generating the training model based on the modified set of social media records.

16. The system of claim 10, wherein, when receiving the estimate of customer experience, the processor is configured to:
receive, as the output from the analytical model and based at least partly on the second set of machine repair records, the estimate of customer experience by using the analytical model with one or more inputs that are based on information that indicates a quantity of visits for the reported customer experience associated with the second set of machine repair records.

17. A non-transitory computer-readable medium storing computer-executable instructions that, when executed by at least one processor, cause the at least one processor to:
obtain a set of machine repair records from a first database;
generate a modified set of machine repair records by, for each record of the set of machine repair records, associating a machine with at least one of one or more defects, a repair of the one or more defects, or one or more repair characteristics,
wherein one or more instructions, of the computer-executable instructions that cause the at least one processor to generate the modified set of machine repair records, cause the at least one processor to generate a root cause model indicative of a root cause for two or more repairs, and
wherein the root cause is associated with one or more of a value identifying a service organization associated with the machine or a value identifying a technician associated with the machine;
generate a training model, the training model comprising the modified set of machine repair records and a set of survey records indicative of reported experience values;
obtain a set of machine operation records from a second database;
identify at least one time-based machine operation parameter associated with machine operation from the set of machine operation records;
generate a modified set of machine operation records, the modified set of machine operation records comprising a plurality of values associated with the at least one time-based machine operation parameter;
create an analytical model based on the training model and the modified set of machine operation records;
receive, as an output from the analytical model and based at least partly on a second set of machine repair records, an estimate of customer experience;
determine, based at least in part on a comparison of the estimate of customer experience to a reported customer experience associated with the second set of machine repair records, a first system response error; and update, based at least on the first system response error meeting or exceeding a threshold response error, the analytical model to create an updated analytical model having a second system response error less than the first system response error.

18. The non-transitory computer-readable medium of claim 17, wherein each record in the modified set of machine repair records is indicative of at least one of a count of the one or more defects, a severity value associated with the one or more defects, a time span between repairs, or a predicted experience value.

19. The non-transitory computer-readable medium of claim 17, wherein the at least one time-based machine operation parameter comprises time information and at least one of a fuel consumption value, a machine operating parameter, or diagnostic information.

20. The non-transitory computer-readable medium of claim 17, wherein at least one survey record of the set of survey records is indicative of at least one of a reported experience value, an indication of a surveyed machine, a time factor associated with a utilization of the surveyed machine, or a reported experience value associated with the utilization of the surveyed machine.

21. The non-transitory computer-readable medium of claim 17, wherein the computer-executable instructions further cause the at least one processor to:
   obtain a set of social media records from a third database;
   associate at least one record of the set of social media records with the modified set of machine repair records to create a set of modified social media records; and
   generate the training model based on the modified set of social media records.

22. The non-transitory computer-readable medium of claim 17, wherein the estimate of customer experience is received by using the analytical model with one or more inputs that are based on information that indicates a quantity of visits for the reported customer experience associated with the second set of machine repair records.

* * * * *